United States Patent
Puri et al.

(10) Patent No.: US 11,132,249 B1
(45) Date of Patent: Sep. 28, 2021

(54) SOFTWARE CODE CHANGE REVERSAL TOOL

(71) Applicant: BANK OF AMERICA CORPORATION, Charlotte, NC (US)

(72) Inventors: Surina Puri, Charlotte, NC (US); Asif Ahmad Bala, Shelby, NC (US); Arjun Thimmareddy, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/923,776

(22) Filed: Jul. 8, 2020

(51) Int. Cl.
G06F 11/07 (2006.01)
G06F 11/30 (2006.01)
G06F 11/24 (2006.01)

(52) U.S. Cl.
CPC ........ *G06F 11/079* (2013.01); *G06F 11/0772* (2013.01); *G06F 11/24* (2013.01); *G06F 11/3006* (2013.01)

(58) Field of Classification Search
CPC .... G06F 11/0772; G06F 11/079; G06F 11/24; G06F 11/3006
USPC .......................................................... 714/37
See application file for complete search history.

(56) References Cited

U.S. PATENT DOCUMENTS

| | | | |
|---|---|---|---|
| 5,987,439 A | 11/1999 | Gustin et al. | |
| 6,907,405 B2 | 6/2005 | Brett | |
| 7,635,304 B2 | 12/2009 | Wright | |
| 7,720,708 B1 | 5/2010 | Elkins, II et al. | |
| 7,778,853 B2 | 8/2010 | Sussman et al. | |
| 8,023,715 B2 | 9/2011 | Jones et al. | |
| 8,073,777 B2 | 12/2011 | Barry et al. | |
| 8,182,326 B2 | 5/2012 | Speer, II et al. | |
| 8,195,486 B2 | 6/2012 | Berthaud et al. | |
| 8,197,334 B2 | 6/2012 | Chudd et al. | |
| 8,364,528 B2 | 1/2013 | Selinger et al. | |
| 8,700,540 B1 | 4/2014 | Zambrano et al. | |
| 8,781,864 B2 | 7/2014 | De Marcken | |
| 8,996,397 B2 | 3/2015 | Grace et al. | |
| 9,092,575 B2 | 7/2015 | Koenig et al. | |
| 9,104,543 B1 * | 8/2015 | Cavanagh | H04L 41/0677 |
| 9,166,870 B2 | 10/2015 | Denis et al. | |
| 9,202,180 B2 | 12/2015 | Denker et al. | |
| 9,350,601 B2 | 5/2016 | Jain | |
| 9,354,789 B2 | 5/2016 | Stambaugh | |
| 9,363,146 B2 | 6/2016 | Cossins et al. | |
| 9,497,072 B2 | 11/2016 | Gates et al. | |
| 9,548,886 B2 | 1/2017 | Gates et al. | |
| 9,568,392 B2 | 2/2017 | Peleg et al. | |
| 9,712,409 B2 | 7/2017 | Sellers et al. | |
| 9,906,486 B2 | 2/2018 | Shmueli et al. | |
| 10,032,195 B2 | 7/2018 | Abbassi et al. | |
| 10,122,829 B2 | 11/2018 | Saavedra | |

(Continued)

*Primary Examiner* — Chae M Ko
(74) *Attorney, Agent, or Firm* — Michael A. Springs

(57) ABSTRACT

A tool may identify and revert changes that caused network hardware components or hardware servers to malfunction. The tool builds and maintains a graph that represents the hardware components and servers in the system and their dependencies. When a change is made to the system, links and weights in the graph are adjusted to account for the changes. When a component or server is reported as malfunctioning, the tool traverses the graph to locate the changes that are the most likely root causes of the malfunction. The tool may then revert the change to resolve the malfunction.

20 Claims, 3 Drawing Sheets

(56) References Cited

U.S. PATENT DOCUMENTS

| | | | |
|---|---|---|---|
| 10,205,632 | B2 | 2/2019 | Saavedra |
| 10,484,365 | B2 | 11/2019 | Wu et al. |
| 10,553,072 | B2 | 2/2020 | Acres |
| 2004/0032083 | A1 | 2/2004 | Walker et al. |
| 2004/0205237 | A1* | 10/2004 | Doshi ................ H04L 41/0668 709/241 |
| 2006/0079321 | A1 | 4/2006 | Walker et al. |
| 2006/0084501 | A1 | 4/2006 | Walker et al. |
| 2006/0105837 | A1 | 5/2006 | Walker et al. |
| 2006/0168339 | A1* | 7/2006 | Shapiro ................ H04L 45/02 709/241 |
| 2010/0173692 | A1 | 7/2010 | Frick et al. |
| 2014/0289067 | A1 | 9/2014 | Brett |
| 2016/0005094 | A1 | 1/2016 | Goel |
| 2016/0203422 | A1 | 7/2016 | Demarchi et al. |
| 2017/0097763 | A1 | 4/2017 | Sunshine et al. |
| 2017/0178038 | A1 | 6/2017 | Guven et al. |
| 2017/0103350 | A1 | 8/2017 | Sunshine et al. |
| 2018/0114149 | A1 | 4/2018 | Parker et al. |
| 2019/0155961 | A1* | 5/2019 | Alonso ................ G06N 5/022 |

* cited by examiner

SOFTWARE CODE CHANGE REVERSAL TOOL

BACKGROUND

Computing systems typically include a number of network hardware components and hardware servers that operate together to execute one or more software applications.

SUMMARY OF THE DISCLOSURE

Computing systems typically include a number of network hardware components and hardware servers that operate together to execute one or more software applications. For example, hardware servers may execute the software code for the software applications and communicate the results of that execution to other components (e.g., user devices and/or hardware servers) in the system via the network hardware components. During the lifecycle of a software application, several different types of changes can occur in the system that affect the operation of the system and the execution of the software application. For example, certain network hardware components and/or hardware servers may undergo hardware upgrades and/or changes, which may involve certain network hardware components and/or servers being added to or removed from the system. As another example, software upgrades and/or changes may be made in the network hardware components and/or hardware servers. These changes may involve changes to the software code of the software application and/or changes to the firmware and/or software executing on the network hardware components and/or hardware servers.

For a complex system, numerous changes, both hardware and software, may be made each day. These changes may be tested prior to implementing these changes in the system, but the testing may be limited to the components and servers that are directly impacted by the changes. As a result, the effect that the changes have on components and servers further downstream may be unknown. In certain instances, these changes may cause these downstream components and servers to malfunction, but in complex systems, it becomes technically challenging to identify and isolate the change that caused these downstream components and servers to malfunction. For example, with the number of changes that are made per day in these systems and with the layers of interaction and complexity introduced by these changes, it is technically challenging to unweave these layers and to review each change to determine the root cause of the malfunctioning component or server.

This disclosure contemplates a tool that may identify and revert changes that caused network hardware components or hardware servers to malfunction. The tool builds and maintains a graph that represents the hardware components and servers in the system and their dependencies. When a change is made to the system, links and weights in the graph are adjusted to account for the changes. When a component or server is reported as malfunctioning, the tool traverses the graph to locate the changes that are the most likely root causes of the malfunction. The tool may then revert the change to resolve the malfunction. In this manner, the tool can identify and revert the changes to the system that caused a component to malfunction. As a result, the system can operate properly and the changes can be revaluated for proper implementation in certain embodiments.

In certain embodiments, the weights assigned to the links in the graph indicate the strength of the relationship between the nodes connected to the links (e.g., the lower the weights between two nodes, the greater the association between them). As a result, it can be said that the strength of association is inversely proportional to the weight of the link. In some embodiments, the initial weight assigned to a link between nodes is determined by the type of nodes being connected. A low weight may be assigned for links connecting nodes within intra cluster/logical group and for nodes connecting a change to a component. A high weight may be assigned for links connecting nodes from two different logical groups. Using historical change and incident data, the more number of times nodes from two different logical groups appear together, the more the weight between the nodes is reduced. An exponential equation may be used to reduce the weight of the link connecting the nodes together. Although described in the context of malfunctioning components, the tool is not limited to the malfunctioning of individual components. The tool takes into account logical grouping of hardware and software components into an application. The below embodiments will apply when issues are reported at the logical group level (e.g., application level).

In some embodiments, the decision that a change caused an incident is made after comparing text/details in the change and the incident. For example, "access being modified" will have a high similarity to "access denied error." Ultimately, the change requests may be ranked based on the probability that they caused the specific incident mentioned using cause and effect modeling.

In certain embodiments, to accurately rank the list of possible changes, a model of the cause and effect relationship between historical changes and incidents is used. If a change with X caused incident with Y, the model reflects X→Y (e.g., X implies Y). If a change with Z results in incident Y, then the model reflects that Z implies Y. The sum of the distance from X to Y and Z to Y is calculated and the lowest one is chosen. Certain embodiments of the tool are described below.

According to an embodiment, an apparatus includes a memory and a hardware processor communicatively coupled to the memory. The hardware processor determines that a first hardware server is communicatively coupled to a first network hardware component and a second hardware server and in response to determining that the first hardware server is communicatively coupled to the first network hardware component and the second hardware server, generates a graph that includes a first node representing the first hardware server, a second node representing the first network hardware component, a third node representing the second hardware server, a first link between the first node and the second node, and a second link between the first node and the third node. The hardware processor also determines that the second hardware server is communicatively coupled to a second network hardware component and a third network hardware component and in response to determining that the second hardware server is communicatively coupled to the second network hardware component and the third network hardware component, adds, to the graph, a fourth node representing the second network hardware component, a fifth node representing the third network hardware component, a third link between the third node and the fourth node, and a fourth link between the third node and the fifth node. The hardware processor further assigns an initial weight to the first, second, third, and fourth links, receives a first change request indicating that a change to the second network hardware component impacted the second hardware server and in response to the first change request, reduces the initial weight of the third link. The hardware processor also receives a second change request indicating that a change to the third network hardware component impacted the second hardware server and in response to the second change request, reduces the initial weight of the fourth link. The hardware processor further receives a report indicating that the first network hardware component is malfunctioning and in response to the report, sums the initial weight of the first link, the initial weight of the second link, and the reduced initial weight of the third link to produce a first sum, sums the initial weight of the first link, the initial weight of the second link, and the reduced initial weight of the fourth link to produce a second sum, determines that the first sum is less than the second sum, and in response to determining that the first sum is less than the second sum, determines that the change to the second network hardware component caused the first network hardware component to malfunction.

According to another embodiment, a method includes determining, by a hardware processor communicatively coupled to a memory, that a first hardware server is communicatively coupled to a first network hardware component and a second hardware server and in response to determining that the first hardware server is communicatively coupled to the first network hardware component and the second hardware server, generating, by the hardware processor, a graph comprising a first node representing the first hardware server, a second node representing the first network hardware component, a third node representing the second hardware server, a first link between the first node and the second node, and a second link between the first node and the third node. The method also includes determining, by the hardware processor, that the second hardware server is communicatively coupled to a second network hardware component and a third network hardware component and in response to determining that the second hardware server is communicatively coupled to the second network hardware component and the third network hardware component, adding, by the hardware processor and to the graph, a fourth node representing the second network hardware component, a fifth node representing the third network hardware component, a third link between the third node and the fourth node, and a fourth link between the third node and the fifth node. The method further includes assigning, by the hardware processor, an initial weight to the first, second, third, and fourth links, receiving, by the hardware processor, a first change request indicating that a change to the second network hardware component impacted the second hardware server and in response to the first change request, reducing, by the hardware processor, the initial weight of the third link. The method also includes receiving, by the hardware processor, a second change request indicating that a change to the third network hardware component impacted the second hardware server and in response to the second change request, reducing, by the hardware processor, the initial weight of the fourth link. The method further includes receiving, by the hardware processor, a report indicating that the first network hardware component is malfunctioning and in response to the report, summing, by the hardware processor, the initial weight of the first link, the initial weight of the second link, and the reduced initial weight of the third link to produce a first sum, summing, by the hardware processor, the initial weight of the first link, the initial weight of the second link, and the reduced initial weight of the fourth link to produce a second sum, determining, by the hardware processor, that the first sum is less than the second sum, and in response to determining that the first sum is less than the second sum, determining, by the hardware processor, that the change to the second network hardware component caused the first network hardware component to malfunction.

According to another embodiment, a system includes a first hardware server, a second hardware server, a first network hardware component, a second network hardware component, a third network hardware component, and a code reversal tool that includes a hardware processor communicatively coupled to a memory. The hardware processor determines that the first hardware server is communicatively coupled to the first network hardware component and the second hardware server and in response to determining that the first hardware server is communicatively coupled to the first network hardware component and the second hardware server, generate a graph comprising a first node representing the first hardware server, a second node representing the first network hardware component, a third node representing the second hardware server, a first link between the first node and the second node, and a second link between the first node and the third node. The hardware processor also determines that the second hardware server is communicatively coupled to the second network hardware component and the third network hardware component and in response to determining that the second hardware server is communicatively coupled to the second network hardware component and the third network hardware component, add, to the graph, a fourth node representing the second network hardware component, a fifth node representing the third network hardware component, a third link between the third node and the fourth node, and a fourth link between the third node and the fifth node. The hardware processor further assigns an initial weight to the first, second, third, and fourth links, receives a first change request indicating that a change to the second network hardware component impacted the second hardware server, and in response to the first change request, reduces the initial weight of the third link. The hardware processor also receives a second change request indicating that a change to the third network hardware component impacted the second hardware server and in response to the second change request, reduces the initial weight of the fourth link. The hardware processor further receives a report indicating that the first network hardware component is malfunctioning and in response to the report, sums the initial weight of the first link, the initial weight of the second link, and the reduced initial weight of the third link to produce a first sum, sums the initial weight of the first link, the initial weight of the second link, and the reduced initial weight of the fourth link to produce a second sum, determines that the first sum is less than the second sum, and in response to determining that the first sum is less than the second sum, determine that the change to the second network hardware component caused the first network hardware component to malfunction.

Certain embodiments provide one or more technical advantages. For example, an embodiment identifies and reverts the root cause for a malfunctioning network hardware component or hardware server. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
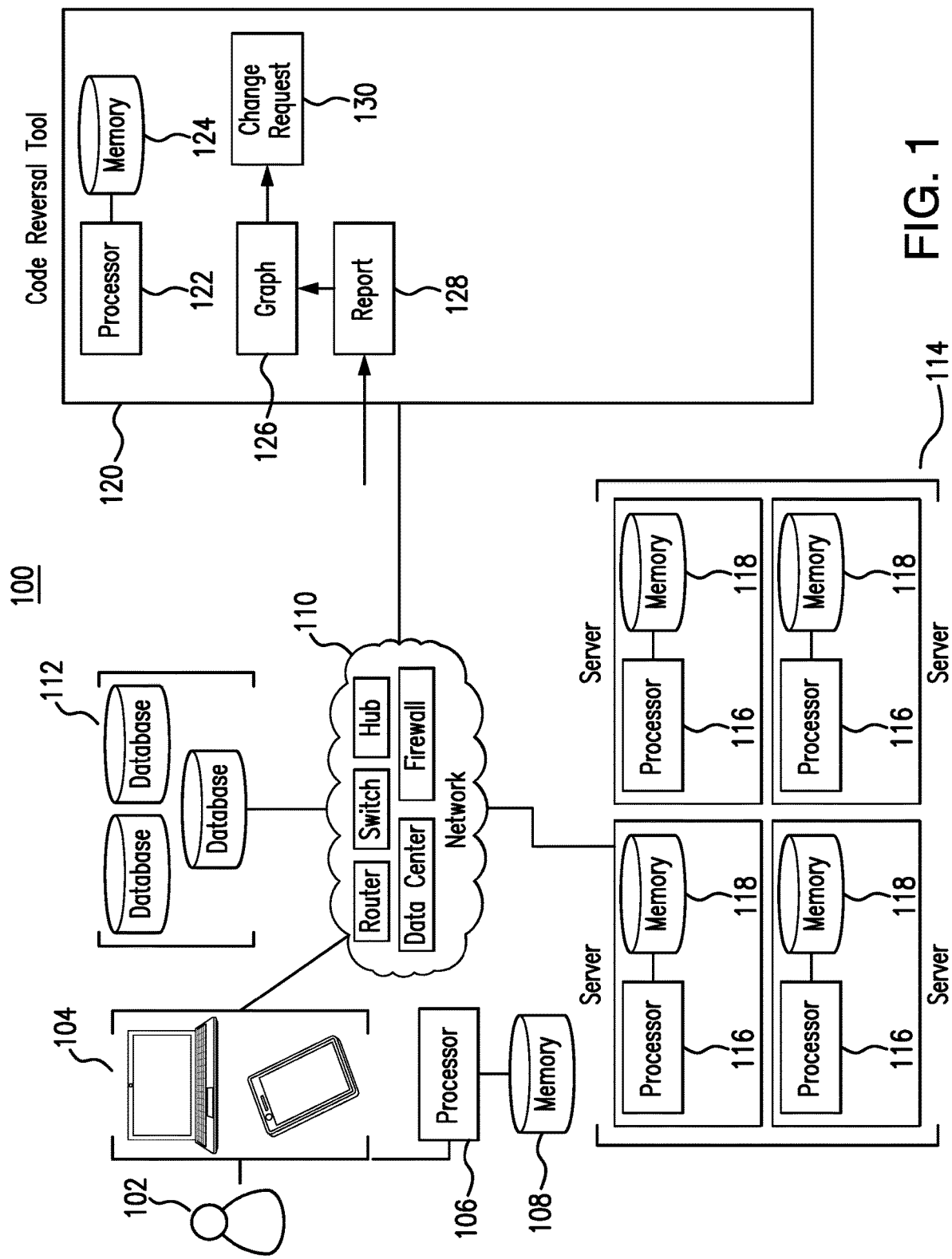
FIG. 1 illustrates an example system.
Figure 2:
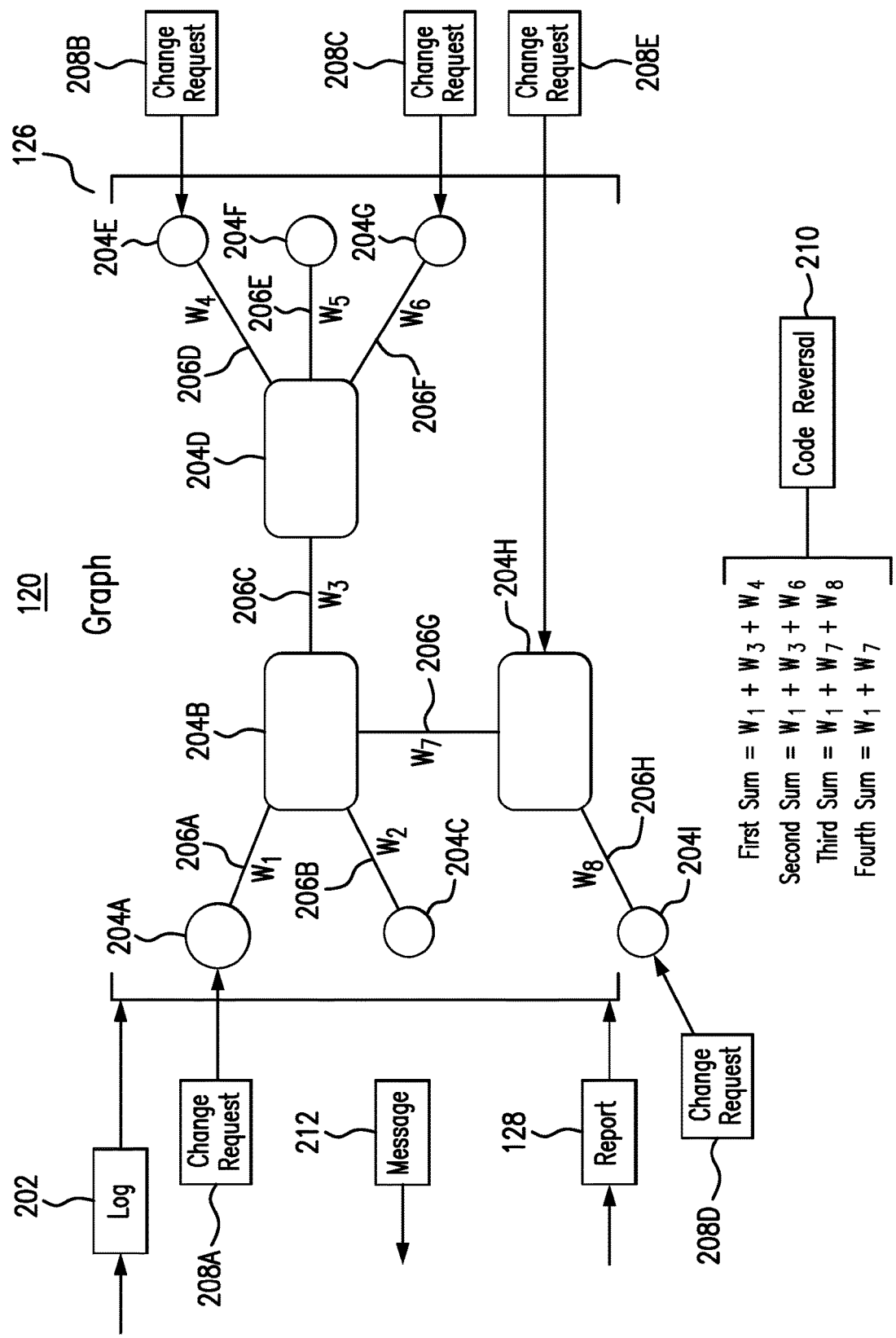
FIG. 2 illustrates an example code reversal tool of the system of FIG. 1.
Figure 3:
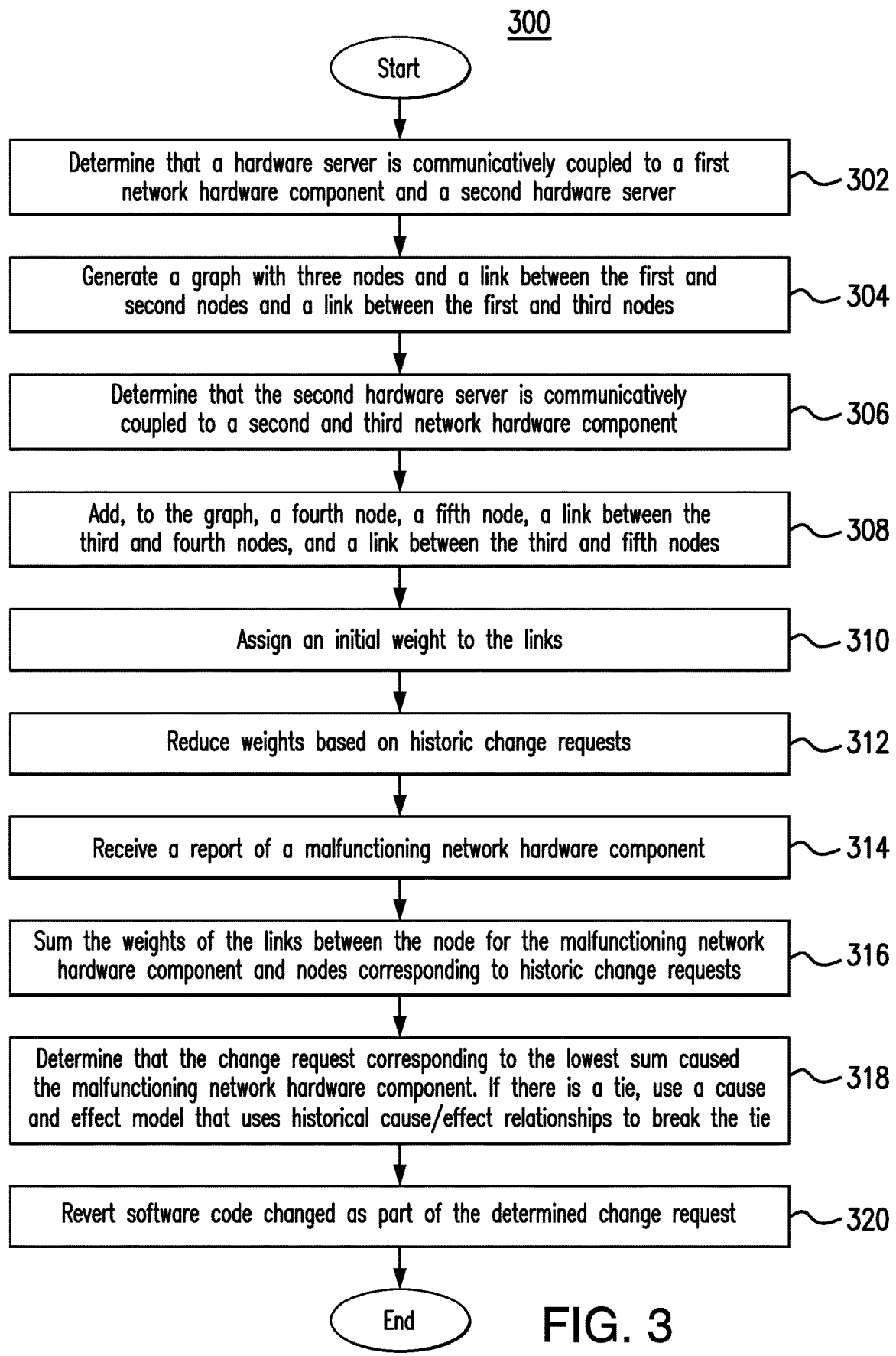
FIG. 3 is a flowchart illustrating a method for identifying the root causes of malfunctioning components using the system of FIG. 1.

Embodiments of the present disclosure and its advantages are best understood by referring to FIGS. 1 through 3 of the drawings, like numerals being used for like and corresponding parts of the various drawings.

Computing systems typically include a number of network hardware components and hardware servers that operate together to execute one or more software applications. For example, hardware servers may execute the software code for the software applications and communicate the results of that execution to other components (e.g., user devices and/or hardware servers) in the system via the network hardware components. During the lifecycle of a software application, several different types of changes can occur in the system that affect the operation of the system and the execution of the software application. For example, certain network hardware components and/or hardware servers may undergo hardware upgrades and/or changes, which may involve certain network hardware components and/or servers being added to or removed from the system. As another example, software upgrades and/or changes may be made in the network hardware components and/or hardware servers. These changes may involve changes to the software code of the software application and/or changes to the firmware and/or software executing on the network hardware components and/or hardware servers.

For a complex system, numerous changes, both hardware and software, may be made each day. These changes may be tested prior to implementing these changes in the system, but the testing may be limited to the components and servers that are directly impacted by the changes. As a result, the effect that the changes have on components and servers further downstream may be unknown. In certain instances, these changes may cause these downstream components and servers to malfunction, but in complex systems, it becomes technically challenging to identify and isolate the change that caused these downstream components and servers to malfunction. For example, with the number of changes that are made per day in these systems and with the layers of interaction and complexity introduced by these changes, it is technically challenging to unweave these layers and to review each change to determine the root cause of the malfunctioning component or server.

This disclosure contemplates a tool that may identify and revert changes that caused network hardware components or hardware servers to malfunction. The tool builds and maintains a graph that represents the hardware components and servers in the system and their dependencies. When a change is made to the system, links and weights in the graph are adjusted to account for the changes. When a component or server is reported as malfunctioning, the tool traverses the graph to locate the changes that are the most likely root causes of the malfunction. The tool may then revert the change to resolve the malfunction. In this manner, the tool can identify and revert the changes to the system that caused a component to malfunction. As a result, the system can operate properly and the changes can be revaluated for proper implementation in certain embodiments.

A practical application of the tool is that it identifies the root causes of malfunctioning network hardware components and/or hardware servers through a graph-based approach. In this manner, it becomes easier to resolve or fix the malfunctioning components. The system will be described in more detail using FIGS. 1 through 3.

FIG. 1 illustrates an example system 100. As seen in FIG. 1, system 100 includes one or more devices 104, a network 110, one or more databases 112, one or more servers 114, and a code reversal tool 120. Generally, system 100 uses a graph-based approach to track and identify changes to the components of system 100. The graph can then be used to identify the root causes of malfunctioning components in particular embodiments.

User 102 may use device 104 to interact with other components of system 100. For example, user 102 may use device 104 to initiate execution of applications using servers 114 and/or databases 112. As another example, user 102 may use device 104 to develop software code for applications that execute on servers 114. User 102 may also use device 104 to change software code and/or firmware executing on network 110, servers 114, and/or databases 112. In the example of FIG. 1, device 104 includes a processor 106 and a memory 108. Processor 106 and memory 108 may be configured to perform any of the functions of device 104 described herein.

Devices 104 include any appropriate device for communicating with components of system 100 over network 110. For example, devices 104 may be a telephone, a mobile phone, a computer, a laptop, a tablet, an automated assistant, and/or a cash register. This disclosure contemplates device 104 being any appropriate device for sending and receiving communications over network 110. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. Device 104 may include a hardware processor 106, memory 108, and/or circuitry configured to perform any of the functions or actions of device 104 described herein. For example, a software application designed using software code may be stored in the memory 108 and executed by the processor 106 to perform the functions of device 104.

Processor 106 is any electronic circuitry, including, but not limited to microprocessors, application specific integrated circuits (ASIC), application specific instruction set processor (ASIP), and/or state machines, that communicatively couples to memory 108 and controls the operation of device 104. Processor 106 may be 8-bit, 16-bit, 32-bit, 64-bit or of any other suitable architecture. Processor 106 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 106 may include other hardware that operates software to control and process information. Processor 106 executes software stored on memory to perform any of the functions described herein. Processor 106 controls the operation and administration of device 104 by processing information received from devices 106, network 110, and memory 108. Processor 106 may be a programmable logic device, a microcontroller, a microprocessor, any suitable processing device, or any suitable combination of the preceding. Processor 106 is not limited to a single processing device and may encompass multiple processing devices.

Memory 108 may store, either permanently or temporarily, data, operational software, or other information for processor 106. Memory 108 may include any one or a combination of volatile or non-volatile local or remote devices suitable for storing information. For example, memory 108 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 108, a disk, a CD, or a flash drive. In particular embodiments, the software may include an application executable by processor 106 to perform one or more of the functions described herein.

Network 110 facilitates communication amongst the various components of system 100. Network 110 may include one or more different network hardware components. As seen in FIG. 1, network 110 may include a router, a switch, a hub, a data center, and/or a firewall. This disclosure contemplates network 110 including any suitable number of any suitable type of hardware network component. Network 110 is not limited to the network hardware components shown in FIG. 1. The network hardware components may be configured and connected to facilitate the communication of messages and/or packets from one component of system 100 to another component of system 100. In certain embodiments, network 110 may receive messages and/or packets from components that are external to system 100 and communicate those packages and messages to components of system 100.

Network 110 allows communication between and amongst the various components of system 100. For example, user 102 may use devices 104 to communicate over network 110. This disclosure contemplates network 110 being any suitable network operable to facilitate communication between the components of system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Databases 112 may store information that is used by other components of system 100. For example, databases 112 may store information used by applications executing on servers 114. As another example, databases 112 may store information such as logs that are used by code reversal tool 120. The information may be accessed by other components of system 100 through network 110.

Servers 114 execute applications in system 100. Each server 114 may execute a different application. In some instances, multiple servers 114 may be used to execute a portion of the same application. In other instances, multiple servers 114 may be used to execute multiple instances of the same application. Servers 114 may receive instructions from other components of system 100 via network 110. Additionally, servers 114 may communicate the results of executing applications to other components of system 100 through a network 110. In the example of FIG. 1, each server 114 includes a processor 116 and a memory 118. Processor 116 and memory 118 may be configured to perform any of the functions of servers 114 described herein.

Processor 116 is any electronic circuitry, including, but not limited to microprocessors, application specific integrated circuits (ASIC), application specific instruction set processor (ASIP), and/or state machines, that communicatively couples to memory 118 and controls the operation of servers 114. Processor 116 may be 8-bit, 16-bit, 32-bit, 64-bit or of any other suitable architecture. Processor 116 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 116 may include other hardware that operates software to control and process information. Processor 116 executes software stored on memory to perform any of the functions described herein. Processor 116 controls the operation and administration of servers 114 by processing information received from devices 104, network 110, and memory 118. Processor 116 may be a programmable logic device, a microcontroller, a microprocessor, any suitable processing device, or any suitable combination of the preceding. Processor 116 is not limited to a single processing device and may encompass multiple processing devices.

Memory 118 may store, either permanently or temporarily, data, operational software, or other information for processor 116. Memory 118 may include any one or a combination of volatile or non-volatile local or remote devices suitable for storing information. For example, memory 118 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 118, a disk, a CD, or a flash drive. In particular embodiments, the software may include an application executable by processor 116 to perform one or more of the functions described herein.

Various changes may be made to the components of system 100. For example, the user 102 may change software code for applications executing on servers 114 (e.g., by applying software updates, patches, and/or upgrades). As another example, a user 102 may change firmware executing on one or more network hardware components in network 110. As another example, user 102 may add or remove a network hardware component from network 110 (e.g., by yanking a router, disabling a firewall, replacing a switch, etc.). The user 102 may also add or remove databases 112 and/or servers 114 from system 100. When a change is made, a log in databases 112 may be updated to record the change.

When a change is made to any component of system 100, it may impact the operation of other components within system 100. In some instances, the changes may cause other components of system to malfunction. It may be difficult to identify the change that caused a component to malfunction if the malfunctioning component is far downstream from the component that was changed. When many changes are implemented over a period of time before the malfunctioning component is discovered, it is technically challenging to determine the change that is the root cause of the malfunctioning component.

Code reversal tool 120 uses a graph-based approach to determine and identify a change in system 100 that is the root cause of a malfunctioning component. In particular embodiments, code reversal tool 120 makes it easier to identify and resolve the root causes of malfunctioning components in system 100. In the example of FIG. 1, code reversal tool 120 includes a processor 122 and a memory 124. Processor 122 and memory 124 may be configured to perform any of the functions of code reversal tool described herein.

Processor 122 is any electronic circuitry, including, but not limited to microprocessors, application specific integrated circuits (ASIC), application specific instruction set processor (ASIP), and/or state machines, that communicatively couples to memory 124 and controls the operation of code reversal tool 120. Processor 122 may be 8-bit, 16-bit, 32-bit, 64-bit or of any other suitable architecture. Processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 122 may include other hardware that operates software to control and process information. Processor 122 executes software stored on memory to perform any of the functions described herein. Processor 122 controls the operation and administration of code reversal tool 120 by processing information received from devices 104, network 110, and memory 124. Processor 122 may be a programmable logic device, a microcontroller, a microprocessor, any suitable processing device, or any suitable combination of the preceding. Processor 122 is not limited to a single processing device and may encompass multiple processing devices.

Memory 124 may store, either permanently or temporarily, data, operational software, or other information for processor 122. Memory 124 may include any one or a combination of volatile or non-volatile local or remote devices suitable for storing information. For example, memory 124 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 124, a disk, a CD, or a flash drive. In particular embodiments, the software may include an application executable by processor 122 to perform one or more of the functions described herein.

Code reversal tool 120 generates and maintains a graph 126. Graph 126 may represent the relationships between and amongst the various components of system 100. For example, graph 126 may include nodes for network hardware components in network 110, databases 112, and/or servers 114. Graph 126 may include links between the nodes that represent the dependencies between the various components of system 100. Weights may also be assigned to the links that represent the strength of the relationship between and amongst components. Code reversal tool 112 may generate graph 126 based on logs stored in database 112. When a change is made to system 100, these logs may be updated and code reversal tool 120 may update graph 126 accordingly.

Code reversal tool 120 may track change requests 130. Each change request 130 may identify a change to a component of system 100. For example, change request 130 may indicate a change to the software code of an application executing on server 114. As another example, change request 130 may indicate a change to a network hardware component in network 110, such as a component being added, removed, and/or upgraded. As yet another example, change request 130 may indicate a change to the hardware of server 114 and/or database 112. Change request 130 may be created by user 112 to record and/or request a change to a component of system 100. Code reversal tool 120 may detect change request 130 and update graph 126 accordingly to track the components of system 100 that are changed by change request 130.

Code reversal tool 120 may receive a report 128 of a malfunctioning component in system 100. When code reversal tool 120 receives report 128, code reversal tool 120 may traverse graph 126 to discover the change request 130 that is the root cause of the malfunctioning component. In certain embodiments, code reversal tool 120 may start at the node representing the malfunctioning component and traverse the various links to one or more components affected by change request 130. The node affected by the change request 130 that is closest to the node for the malfunctioning component based on weights assigned to the links between the nodes is identified as the root cause of the malfunctioning component in certain embodiments. A more detailed description of graph generation and traversal is provided using FIGS. 2 and 3.

FIG. 2 illustrates an example code reversal tool 120 of the system 100 of FIG. 1. Generally, code reversal tool 120 uses a graph-based approach to identify and revert changes to system 100 that cause certain components of system 100 to malfunction. In particular embodiments, code reversal tool 120 improves the operation of system 100 by resolving issues that cause certain components of system 100 to malfunction.

Code reversal tool 120 builds graph 126 using information from one or more logs 202. Any suitable number of logs 202 may be used by code reversal tool 120 to build graph 126. For example, code reversal tool 120 may analyze a log 202 that stores information about various components that were added or removed from system 100 (e.g., network hardware components that were added to or removed from network 110). As another example, code reversal 120 may analyze a log 202 that includes information about software changes that were made to applications executing on servers 114 and system 100 (e.g., a lot 202 of changes to software code, software patches/updates applied to applications, etc.). As yet another example, code reversal tool 120 may analyze logs 202 that include information about firmware updates and/or upgrades for components of system 100 to build graph 126 (e.g., firmware upgrades and/or changes to network hardware components of network 110). Code reversal tool 120 may retrieve one or more logs 202 from databases 112 and system 100.

Code reversal tool 120 builds a graph 126 that includes one or more nodes 204 representative of components within system 100. In the example of FIG. 2, graph 126 includes nodes 204A, 204B, 204C, 204D, 204E, 204F, 204G, 204H, and 204I. For example, when log 202 indicates that a component, such as a server 114, has been added to system 100, code reversal tool 120 adds a node 204 to graph 126.

That node 204 represents the server 114 that was added to system 100. When log 202 indicates that a component of system 100 has been removed from system 100, code reversal tool 120 may remove a corresponding node 204 from graph 126. In this manner, the nodes 204 in graph 126 represent the various components of system 100. In the example of FIG. 2, nodes 204A, 204C, 204E, 204F, 204G, and 204I represent network hardware components in network 110. Nodes 204B, 204D, and 204H represent servers 114 and/or applications executing on servers 114. Although not illustrated, additional nodes 204 may be added for databases 112.

Code reversal tool 120 also uses information of log 202 to understand the relationships between and amongst the various components of system 100. For example, logs 202 may include information that shows the connectivity between servers 114 and various network hardware components 110. As another example, logs 202 may include information that shows the dependencies that applications executing on servers 114 have on other components of system 100 (e.g., databases 112 and/or network hardware components in network 110). Code reversal tool 120 may add link 206 to graph 126 that may represent the relationships and dependencies between components. Links 206 may connect two or more nodes 204 with each other. When connected, link 206 represents a relationship or dependency between the two connected nodes 204.

In the example of FIG. 2, graph 126 includes links 206A, 206B, 206C, 206D, 206E, 206F, 206G, and 206H. Link 206A connects nodes 204A and 204B. Link 206B connects nodes 204C and 204D. Link 206C connects nodes 204B and 204D. Link 206D connects nodes 204D and 204E. Link 206E connects nodes 204D and 204F. Link 206F connects nodes 204D and 204G. Link 206G connects nodes 204B and 204H. Link 206H connects nodes 204H and 204I. These links 206 represent the connectivity, relationships, and/or dependencies between the components of system 100 represented by the nodes 204 connected to the links 206. For example, link 206A may represent a connectivity between a network hardware component and a server 114. Another example, link 206C may represent a dependency between an application executing on a first server 114 and another application executing on another server 114. As yet another example, link 206E may represent a dependency of an application executing on server 114 on a database 112.

Code reversal tool 120 assigns weights to the links 206 and graph 126. Each weight represents the strength of the link 206 between two nodes 204. Initially, each link 206 may be assigned a default initial weight. Code reversal tool 120 may adjust the values of these weights based on historic changes to the components represented by the nodes 204 connected by the links 206. In the example of FIG. 2, link 206A is assigned a weight W1, link 206B is assigned a weight W2, link 206C is assigned a weight W3, link 206D is assigned a weight W4, link 206E is assigned a weight W5, link 206F is assigned a weight W6, link 206G is assigned a weight W7, and link 206H is assigned a weight W8. Each of these weights may be initially set to the same default value.

Code reversal tool 120 adjusts the values of the weights in graph 126 based on information in historic change requests 208. Code reversal tool 120 may receive change request 208 from databases 112. Change requests 208 may be generated when a user 102 requests that a change be made to a particular component of system 100. For example, if a particular network hardware component of network 110 is removed or added to network 110, then a change request 208 is generated and code reversal tool 120 associates that change request 208 to a node 204 representing the network hardware component. As another example, if user 102 changes the software code for an application executing on a server 114, then a change request 208 is generated for that software code change. Code reversal tool 120 then associates that change request 208 to the node 204 representing the application executing on the server 114. In each of these instances, after linking the change request 208 to a particular node 204, code reversal 120 adjusts the weight of the link 206 connecting the affected node 204. For example, code reversal tool 120 may reduce the weight of the link 206 connected to the node 204. In particular embodiments, change request 208 may indicate that the change to a particular component of system 100 also impacts another component of system 100. In response to the change request 208, code reversal tool 120 may reduce the weight assigned to the link 206 connecting the node 204 representing the impacted components. In particular embodiments, the more a particular link 206 is impacted by change request 208, the lower the weight assigned to that link 206. For example, if a link 206 is impacted by multiple change requests 208, then that link 206 will have a lower weight than another link that is impacted by no or one change request 208. As another example, code reversal tool 120 may receive a change request 208 and reduce a weight assigned to a link 206. Code reversal tool may then receive another change request 208 and further reduce the weight assigned to that link 206. In particular embodiments, the weights are reduced according to an exponential function. Code reversal tool 120 may adjust weights assigned to links 206 in any suitable manner. For example, code reversal tool 120 may increase weights and decrease weights in response to any type of change request 208.

In the example of FIG. 2, code reversal tool 120 may receive various change requests 208. Change request 208A may indicate that a change has been made to a network hardware component represented by node 204A and that this change impacts an application executing on server 114 represented by node 204B. In response, code reversal tool 120 adjusts the weight assigned to link 206A. Code reversal tool 120 may also receive a change request 208B that indicates a change to a network hardware component represented by node 204E. Change request 208B may also indicate that the change impacts an application executing on a server 114 represented by node 204D. In response to change request 208B, code reversal tool 120 adjusts the weight assigned to link 206D. Code reversal tool 120 may receive a change request 208C that indicates a change to a network hardware component represented by node 204G. Change request 208C may also indicate that the change impacts the application executing on server 114 represented by node 204D. In response to change request 208C, code reversal tool 120 adjusts the weight assigned to link 206F. Code reversal tool 120 may receive change request 208E, indicating a change to the software code of an application executing on a server 114, represented by node 204H. Change request 208E may also indicate that this change impacts another application executing on another server 114 represented by node 204B. In response to change request 208E, code reversal tool 120 adjusts the weight assigned to link 206G. Code reversal tool 120 may receive change request 208D, indicating a change to a network hardware component represented by node 204I. Change request 208D may further indicate that the change impacts the operation of an application executing on a server 114 represented by node 204H. In response to change request 208D, code reversal tool 120 adjusts the weight of the link 206H.

Code reversal tool 120 may use graph 126 to determine the root cause of a malfunctioning component in system 100. Code reversal tool 120 may receive a report 128 that indicates a particular component of system 100 is malfunctioning. For example, report 128 may indicate that a network hardware component in network 110, or a server 114 is not functioning properly. In response, code reversal tool 120 may traverse graph 126 to identify one or more change requests 208 that caused the malfunctioning component. In particular embodiments, code reversal tool 120 begins traversing graph 126 at the node 204 corresponding to the malfunctioning component. Code reversal tool 120 then traverses through the links 206 to the various change requests 208 linked to graph 126. As code reversal tool 120 traverses the links 206, code reversal tool 120 keeps a running sum of the weights of the traversed links 206. The sums may then be compared to determine the change request 208 that caused the malfunctioning component. In the example of FIG. 2, report 128 may indicate that the component corresponding to node 204A is malfunctioning. In response, code reversal tool 120 begins at node 204A and begins traversing graph 126 to other change requests 208. Code reversal tool 120 first traverses links 206A, 206C, and 206D to reach change request 208B. Code reversal tool 120 creates a first sum by summing W1, W3, and W4 for this link 206. Code reversal tool 120 then traverses through links 206A, 206C, and 206F to reach change request 208C. Code reversal tool 120 creates a second sum by adding W1, W3, and W6 corresponding to these links 206. Code reversal tool 120 then traverses links 206A, 206G, and 206H to reach change request 208D. Code reversal tool 120 creates a third sum by adding weights W1, W7, and W8 corresponding to these links 206. Code reversal tool 120 then traverses links 206A and 206G to reach change request 208E. Code reversal tool creates a fourth sum by adding weights W1 and W7 corresponding to these links 206. Code reversal tool 120 then compares the sums to determine which change request 208 is the likely cause of the malfunctioning component. For example, code reversal tool 120 may determine that the first sum is the lowest sum of the four sums. In response, code reversal tool 120 may determine that change request 208B is the root cause of the malfunctioning component. This disclosure contemplates that code reversal tool 120 may determine that any change request 208 is the root cause of a malfunctioning component based on any analysis of the one or more sums.

In particular embodiments, the determined change request 208 that caused the malfunctioning component may be a software change. For example, the change request 208 may indicate a change to the software code of an application executing on server 114. Code reversal tool 120 may apply code reversal 210 to resolve the cause of the malfunctioning component. For example, code reversal tool 120 may revert a software code change by changing the software code into a previous version before the change was implemented. As another example, code reversal tool 120 may resolve a bug or error in the software code to fix the malfunctioning component.

In particular embodiments, code reversal tool 120 may analyze the impact that a particular change request 208 will have on system 100. For example, code reversal tool 120 may receive change request 208A. Change request 208A may indicate a change to a network hardware component represented by node 204A. Before the change indicated by change request 208A is implemented, code reversal tool 120 may traverse graph 126 to determine the other components of system 100 that are most likely to be impacted by change request 208A. For example, code reversal tool 120 may find all the nodes 204 within a threshold distance or weight from node 204A by traversing the links 206 and summing their respective weights. The traversals that produce a sum of weights less than the threshold will indicate nodes 204 that are likely to be impacted by change request 208A. Code reversal tool 120 may generate a message 212 and communicate the message 212 to indicate the nodes 204 and the components corresponding to those nodes 204 that are likely to be impacted by change request 208. In this manner, a user 102 is notified of the potential impact of a change request 208 before that change request 208 is implemented.

FIG. 3 is a flowchart illustrating a method 300 for identifying the root causes of malfunctioning components using the system 100 of FIG. 1. Generally, code reversal tool 120 performs the steps of method 300. In particular embodiments, by performing method 300, code reversal tool 120 identifies the root causes of malfunctioning components and resolves these root causes.

Code reversal tool 120 determines that a hardware server 114 is communicatively coupled to a first network hardware component and a second hardware server 114 in step 302. In step 304, code reversal tool 120 generates a graph 126 with three nodes 204, a link 206 between the first and second nodes 204, and a link 206 between the first and third nodes 204. Code reversal tool 120 then determines that the second hardware server 114 is communicatively coupled to a second and third network hardware component in step 306. In step 308, code reversal tool 120 adds to the graph 126 a fourth node 204, a fifth node 204, a link 206 between the third and fourth nodes 204, and a link 206 between the third and fifth nodes 204.

Code reversal tool 120 then assigns an initial weight to the links 206 in step 310. In step 312, code reversal tool reduces the weights based on historic change requests 208. In particular embodiments, the more change requests 208 that impact a particular link 206, the more the weight of that link 206 is reduced. In some embodiments, the weight of a link 206 may be reduced according to an exponential function.

Code reversal tool 120 receives a report 128 of a malfunctioning network hardware component in step 314. In step 316, code reversal tool 120 sums the weights of the links 206 between the node 204 for the malfunctioning network hardware component and nodes 204 associated with historic change requests 208. Code reversal tool 120 then determines that the change request 208 corresponding to the lowest sum caused the malfunctioning network hardware component in step 318. If there is a tie in the sums, code reversal tool 120 uses a cause and effect model that uses historical cause and effect relationships to break the tie, in certain embodiments. In some embodiments, the decision that a change caused an incident is made after comparing text/details in the change and the incident. For example, "access being modified" will have a high similarity to "access denied error." Ultimately, the change requests may be ranked based on the probability that they caused the specific incident mentioned using cause and effect modeling. In certain embodiments, to accurately rank the list of possible changes, a model of the cause and effect relationship between historical changes and incidents is used. If a change with X caused incident with Y, the model reflects X→Y (e.g., X implies Y). If a change with Z results in incident Y, then the model reflects that Z implies Y. The sum of the distance from X to Y and Z to Y is calculated and the lowest one is chosen. In step 320, code reversal tool 120 reverts software code changed as part of the determined change request 208.

Modifications, additions, or omissions may be made to method 300 depicted in FIG. 3. Method 300 may include more, fewer, or other steps. For example, steps may be performed in parallel or in any suitable order. While discussed as code reversal tool 120 performing the steps, any suitable component of system 100, such as device(s) 104 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory; and
a hardware processor communicatively coupled to the memory, the hardware processor configured to:
  determine that a first hardware server is communicatively coupled to a first network hardware component and a second hardware server;
  in response to determining that the first hardware server is communicatively coupled to the first network hardware component and the second hardware server, generate a graph comprising a first node representing the first hardware server, a second node representing the first network hardware component, a third node representing the second hardware server, a first link between the first node and the second node, and a second link between the first node and the third node;
  determine that the second hardware server is communicatively coupled to a second network hardware component and a third network hardware component;
  in response to determining that the second hardware server is communicatively coupled to the second network hardware component and the third network hardware component, add, to the graph, a fourth node representing the second network hardware component, a fifth node representing the third network hardware component, a third link between the third node and the fourth node, and a fourth link between the third node and the fifth node;
  assign an initial weight to the first, second, third, and fourth links;
  receive a first change request indicating that a change to the second network hardware component impacted the second hardware server;
  in response to the first change request, reduce the initial weight of the third link;
  receive a second change request indicating that a change to the third network hardware component impacted the second hardware server;
  in response to the second change request, reduce the initial weight of the fourth link;
  receive a report indicating that the first network hardware component is malfunctioning;
  in response to the report:
    sum the initial weight of the first link, the initial weight of the second link, and the reduced initial weight of the third link to produce a first sum;
    sum the initial weight of the first link, the initial weight of the second link, and the reduced initial weight of the fourth link to produce a second sum;
    determine that the first sum is less than the second sum; and
    in response to determining that the first sum is less than the second sum, determine that the change to the second network hardware component caused the first network hardware component to malfunction.

2. The apparatus of claim 1, the hardware processor further configured to:
  receive a third change request indicating that a change to the second network hardware component impacted the second hardware server; and
  in response to the third change request, further reduce the reduced initial weight of the third link.

3. The apparatus of claim 1, the hardware processor further configured to:
  receive a request to change the first network hardware component, the request indicating a value;
  determine that the first sum is less than the value; and
  in response to determining that the first sum is less than the value, communicate a message indicating that the second network hardware component will be impacted by the change in the request.

4. The apparatus of claim 1, the hardware processor further configured to revert a software code change to the second network hardware component in response to determining that the change to the second network hardware component caused the first network hardware component to malfunction.

5. The apparatus of claim 1, the hardware processor further configured to:
  detect, based on a log, that a fourth network hardware component was added to a network such that the fourth network hardware component is communicatively coupled to the first hardware server;
  add, to the graph, a sixth node representing the fourth network hardware component; and
  add, to the graph, a fifth link between the first node and the sixth node.

6. The apparatus of claim 1, wherein reducing the initial weight of the third link is performed according to an exponential function.

7. The apparatus of claim 1, the hardware processor further configured to:
  detect that the first network hardware component has been removed; and
  in response to detecting that the first network hardware component has been removed, remove the second node from the graph.

8. A method comprising:
  determining, by a hardware processor communicatively coupled to a memory, that a first hardware server is communicatively coupled to a first network hardware component and a second hardware server;
  in response to determining that the first hardware server is communicatively coupled to the first network hardware component and the second hardware server, generating, by the hardware processor, a graph comprising a first node representing the first hardware server, a second node representing the first network hardware component, a third node representing the second hardware server, a first link between the first node and the second node, and a second link between the first node and the third node;

determining, by the hardware processor, that the second hardware server is communicatively coupled to a second network hardware component and a third network hardware component;

in response to determining that the second hardware server is communicatively coupled to the second network hardware component and the third network hardware component, adding, by the hardware processor and to the graph, a fourth node representing the second network hardware component, a fifth node representing the third network hardware component, a third link between the third node and the fourth node, and a fourth link between the third node and the fifth node;

assigning, by the hardware processor, an initial weight to the first, second, third, and fourth links;

receiving, by the hardware processor, a first change request indicating that a change to the second network hardware component impacted the second hardware server;

in response to the first change request, reducing, by the hardware processor, the initial weight of the third link;

receiving, by the hardware processor, a second change request indicating that a change to the third network hardware component impacted the second hardware server;

in response to the second change request, reducing, by the hardware processor, the initial weight of the fourth link;

receiving, by the hardware processor, a report indicating that the first network hardware component is malfunctioning;

in response to the report:
  summing, by the hardware processor, the initial weight of the first link, the initial weight of the second link, and the reduced initial weight of the third link to produce a first sum;
  summing, by the hardware processor, the initial weight of the first link, the initial weight of the second link, and the reduced initial weight of the fourth link to produce a second sum;
  determining, by the hardware processor, that the first sum is less than the second sum; and
  in response to determining that the first sum is less than the second sum, determining, by the hardware processor, that the change to the second network hardware component caused the first network hardware component to malfunction.

9. The method of claim 8, further comprising:
receiving, by the hardware processor, a third change request indicating that a change to the second network hardware component impacted the second hardware server; and
in response to the third change request, further reducing, by the hardware processor, the reduced initial weight of the third link.

10. The method of claim 8, further comprising:
receiving, by the hardware processor, a request to change the first network hardware component, the request indicating a value;
determining, by the hardware processor, that the first sum is less than the value; and
in response to determining that the first sum is less than the value, communicating, by the hardware processor, a message indicating that the second network hardware component will be impacted by the change in the request.

11. The method of claim 8, further comprising reverting, by the hardware processor, a software code change to the second network hardware component in response to determining that the change to the second network hardware component caused the first network hardware component to malfunction.

12. The method of claim 8, further comprising:
detecting, by the hardware processor and based on a log, that a fourth network hardware component was added to a network such that the fourth network hardware component is communicatively coupled to the first hardware server;
adding, by the hardware processor and to the graph, a sixth node representing the fourth network hardware component; and
adding, by the hardware processor and to the graph, a fifth link between the first node and the sixth node.

13. The method of claim 8, wherein reducing the initial weight of the third link is performed according to an exponential function.

14. The method of claim 8, further comprising:
detecting, by the hardware processor, that the first network hardware component has been removed; and
in response to detecting that the first network hardware component has been removed, removing, by the hardware processor, the second node from the graph.

15. A system comprising:
a first hardware server;
a second hardware server;
a first network hardware component;
a second network hardware component;
a third network hardware component; and
a code reversal tool comprising a hardware processor communicatively coupled to a memory, the hardware processor configured to:
  determine that the first hardware server is communicatively coupled to the first network hardware component and the second hardware server;
  in response to determining that the first hardware server is communicatively coupled to the first network hardware component and the second hardware server, generate a graph comprising a first node representing the first hardware server, a second node representing the first network hardware component, a third node representing the second hardware server, a first link between the first node and the second node, and a second link between the first node and the third node;
  determine that the second hardware server is communicatively coupled to the second network hardware component and the third network hardware component;
  in response to determining that the second hardware server is communicatively coupled to the second network hardware component and the third network hardware component, add, to the graph, a fourth node representing the second network hardware component, a fifth node representing the third network hardware component, a third link between the third node and the fourth node, and a fourth link between the third node and the fifth node;
  assign an initial weight to the first, second, third, and fourth links;
  receive a first change request indicating that a change to the second network hardware component impacted the second hardware server;
  in response to the first change request, reduce the initial weight of the third link;

receive a second change request indicating that a change to the third network hardware component impacted the second hardware server;

in response to the second change request, reduce the initial weight of the fourth link;

receive a report indicating that the first network hardware component is malfunctioning;

in response to the report:
- sum the initial weight of the first link, the initial weight of the second link, and the reduced initial weight of the third link to produce a first sum;
- sum the initial weight of the first link, the initial weight of the second link, and the reduced initial weight of the fourth link to produce a second sum;
- determine that the first sum is less than the second sum; and
- in response to determining that the first sum is less than the second sum, determine that the change to the second network hardware component caused the first network hardware component to malfunction.

16. The system of claim 15, the hardware processor further configured to:
- receive a third change request indicating that a change to the second network hardware component impacted the second hardware server; and
- in response to the third change request, further reduce the reduced initial weight of the third link.

17. The system of claim 15, the hardware processor further configured to:
- receive a request to change the first network hardware component, the request indicating a value;
- determine that the first sum is less than the value; and
- in response to determining that the first sum is less than the value, communicate a message indicating that the second network hardware component will be impacted by the change in the request.

18. The system of claim 15, the hardware processor further configured to revert a software code change to the second network hardware component in response to determining that the change to the second network hardware component caused the first network hardware component to malfunction.

19. The system of claim 15, the hardware processor further configured to:
- detect, based on a log, that a fourth network hardware component was added to a network such that the fourth network hardware component is communicatively coupled to the first hardware server;
- add, to the graph, a sixth node representing the fourth network hardware component; and
- add, to the graph, a fifth link between the first node and the sixth node.

20. The system of claim 15, wherein reducing the initial weight of the third link is performed according to an exponential function.

* * * * *